(12) United States Patent
Weiler et al.

(10) Patent No.: US 8,984,532 B2
(45) Date of Patent: Mar. 17, 2015

(54) HYBRID SERVICE-ORIENTED COMPUTING ARCHITECTURE

(71) Applicant: CareFusion 303, Inc., San Diego, CA (US)

(72) Inventors: Aron Weiler, San Diego, CA (US); Martin Orona, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 0 days.

(21) Appl. No.: 13/830,306

(22) Filed: Mar. 14, 2013

(65) Prior Publication Data

US 2014/0282609 A1   Sep. 18, 2014

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC ........................................ *G06F 9/54* (2013.01)
USPC ............................ 719/313; 719/318; 719/331

(58) Field of Classification Search
None
See application file for complete search history.

(56) References Cited

U.S. PATENT DOCUMENTS

| | | | |
|---|---|---|---|
| 7,401,153 B2* | 7/2008 | Traversat et al. | 709/230 |
| 7,643,835 B1* | 1/2010 | Nosack et al. | 455/456.3 |
| 2006/0159077 A1* | 7/2006 | Vanecek, Jr. | 370/360 |
| 2007/0078696 A1* | 4/2007 | Hardin, Jr. | 705/8 |
| 2007/0106537 A1 | 5/2007 | Moore | |
| 2009/0083304 A1 | 3/2009 | Dornbach et al. | |
| 2012/0278797 A1 | 11/2012 | Secrist et al. | |

FOREIGN PATENT DOCUMENTS

CN           101977213 B     11/2012

* cited by examiner

*Primary Examiner* — Craig Dorais
(74) *Attorney, Agent, or Firm* — Mintz Levin Cohn Ferris Glovsky and Popeo, P.C.

(57) ABSTRACT

Loading of a component to an operating system process that is being executed on a node is initiated. Thereafter, a first available resource location is sequentially determined among a plurality of ranked component resource locations and according to the ranking. Subsequently, the component is loaded to the operating system process via the first available resource location. Related apparatus, systems, techniques and articles are also described.

13 Claims, 3 Drawing Sheets

HYBRID SERVICE-ORIENTED COMPUTING ARCHITECTURE

TECHNICAL FIELD

The subject matter described herein relates to a hybrid service-oriented computing architecture in which resources such as components can be accessed locally, when available, or remotely via service calls.

BACKGROUND

A service-oriented computing architecture (SOA) provides a set of components that can be invoked and whose interface descriptions can be published and discovered. In this regard, a component is a software object that interacts with other components, encapsulating certain functionality or a set of functionalities. A component has a clearly defined interface and conforms to a prescribed behavior common to all components within an architecture. In an SOA, resources are made available to other participants in the network as independent services that are accessed in a standardized way. A service is a unit of work done by a service provider to achieve desired end results for a service consumer. Both provider and consumer are roles played by software agents on behalf of their owners.

SUMMARY

In one aspect, loading of a component to an operating system process is initiated. The operating system process is being executed on a node of a computing system comprising memory and at least one data processor that is part of a service oriented architecture. Thereafter, a first available resource location is sequentially determined among a plurality of ranked component resource locations and according to the ranking. Subsequently, the component is loaded to the operating system process via the first available resource location.

The highest ranked resource location can be within the operating system process executing on the node. In such cases, the highest ranked resource location can be determined to be the first available resource location by scanning at least one dynamic linked library (DLL) files at the node.

A second highest ranked resource location can be within a different operating system process executing on the node. The second highest ranked resource location can, for example, be determined to be the first available resource location by scanning at least one dynamic linked library (DLL) files at the node. In some variations, the component can be marshaled from the different operating system process executing on the node. The marshaling can include an inter-process communication (IPC) method.

A third highest ranked resource location can be at a second node remote from the node. With such a variation, the node can poll or access a component management system to identify a location of the component on the second node so that a service can be initiated to obtain the component from the second node.

Loading the component can include loading the component into the memory (e.g., RAM, etc.) at the node.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, processing resources can be minimized and response times increased by using local resources (e.g., components, etc.) when available as opposed to initiating one or more service calls to remote nodes to access resources.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
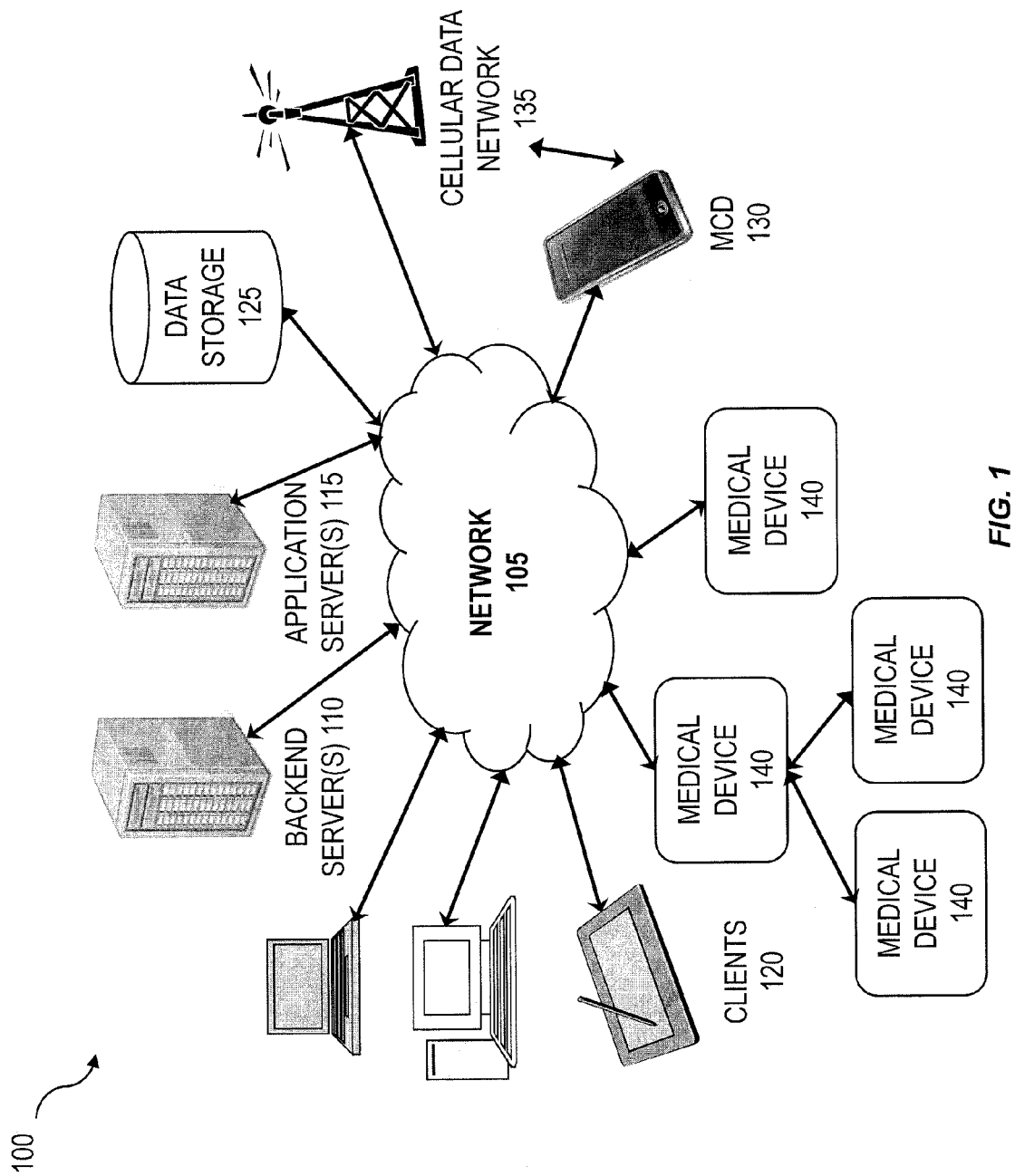
FIG. 1 is a system diagram illustrating a computing landscape within a healthcare environment.

FIG. 1 is a system diagram illustrating a computing landscape 100 within a healthcare environment such as a hospital. Various devices and systems, both local to the healthcare environment and remote from the healthcare environment, can interact via at least one computing network 105. This computing network 105 can provide any form or medium of digital communication connectivity (i.e., wired or wireless) amongst the various devices and systems. Examples of communication networks include a local area network ("LAN"), a wide area network ("WAN"), and the Internet. In some cases, one or more of the various devices and systems can interact directly via peer-to-peer coupling (either via a hardwired connection or via a wireless protocol such as Bluetooth or WiFi). In addition, in some variations, one or more of the devices and systems communicate via a cellular data network. Some or all of the devices and systems can be coupled to a component management system that, as will be described in further detail below, allows such devices and systems to selectively access local resources (e.g., components, etc.) and to selectively access remote resources (e.g., components, etc.) when local resources are not available.

In particular, aspects of the computing landscape 100 can be implemented in a computing system that includes a back-end component (e.g., as a data server 110), or that includes a middleware component (e.g., an application server 115), or that includes a front-end component (e.g., a client computer 120 having a graphical user interface or a Web browser through which a user may interact with an implementation of the subject matter described herein), or any combination of such back-end, middleware, or front-end components. A client 120 and server 110, 115 are generally remote from each other and typically interact through the communications network 105. The relationship of the clients 120 and servers 110, 115 arises by virtue of computer programs running on the respective computers and having a client-server relationship to each other. Clients 120 can be any of a variety of computing platforms that include local applications for providing various functionality within the healthcare environment. Example clients 120 include, but are not limited to, desktop computers, laptop computers, tablets, and other computers with touch-screen interfaces. The local applications can be self-contained in that they do not require network connectivity and/or they can interact with one or more of the servers 110, 115 (e.g., a web browser).

A variety of applications can be executed on the various devices and systems within the computing landscape such as electronic health record applications, medical device monitoring, operation, and maintenance applications, scheduling applications, billing applications and the like.

The network 105 can be coupled to one or more data storage systems 125. The data storage systems 125 can include databases providing physical data storage within the healthcare environment or within a dedicated facility. In addition, or in the alternative, the data storage systems 125 can include cloud-based systems providing remote storage of data in, for example, a multi-tenant computing environment. The data storage systems 125 can also comprise non-transitory computer readable media.

Mobile communications devices (MCDs) 130 can also form part of the computing landscape 100. The MCDs 130 can communicate directly via the network 105 and/or they can communicate with the network 105 via an intermediate network such as a cellular data network. Various types of communication protocols can be used by the MCDs 130 including, for example, messaging protocols such as SMS and MMS.

Various types of medical devices 140 can be used as part of the computing landscape 100. These medical devices 140 can comprise, unless otherwise specified, any type of device or system with a communications interface that characterizes one or more physiological measurements of a patient and/or that characterize treatment of a patient. In some cases, the medical devices 140' communicate via peer to peer wired or wireless communications with another medical device 140 (as opposed to communicating with the network 105). For example, the medical device 140 can comprise a bedside vital signs monitor that is connected to other medical devices 140, namely a wireless pulse oximeter and to a wired blood pressure monitor. One or more operational parameters of the medical devices 140 can be locally controlled by a clinician, controlled via a clinician via the network 105, and/or they can be controlled by one or more of a server 115, 120, a client 125, a MCD 130, and/or another medical device 140.

The computing landscape 100 can provide various types of functionality as may be required within a healthcare environment such as a hospital. For example, a pharmacy can initiate a prescription via one of the client computers 120. This prescription can be stored in the data storage 125 and/or pushed out to other clients 120, an MCD 130, and/or one or more of the medical devices 140. In addition, the medical devices 140 can provide data characterizing one or more physiological measurements of a patient and/or treatment of a patient (e.g., medical device 140 can be an infusion management system, etc.). The data generated by the medical devices 140 can be communicated to other medical devices 140, the servers 110, 115, the clients 120, the MCDs 130, and/or stored in the data storage systems 125.

As will be described in further detail below, a hybrid service oriented architecture can be implemented as part of the computing landscape 100 with the various devices and systems coupled to the network 105 being nodes within such landscape 100. Some or all of the nodes can be coupled to a component management system that provides, for example, information about which resources (e.g., components, etc.) are available across the computing landscape 100. The component management system can be, for example, a software layer. In addition, while the computing landscape 100 forms part of a healthcare environment, it will be appreciated that the current subject matter can be implemented in varying types of service oriented computing environments.

Figure 2:
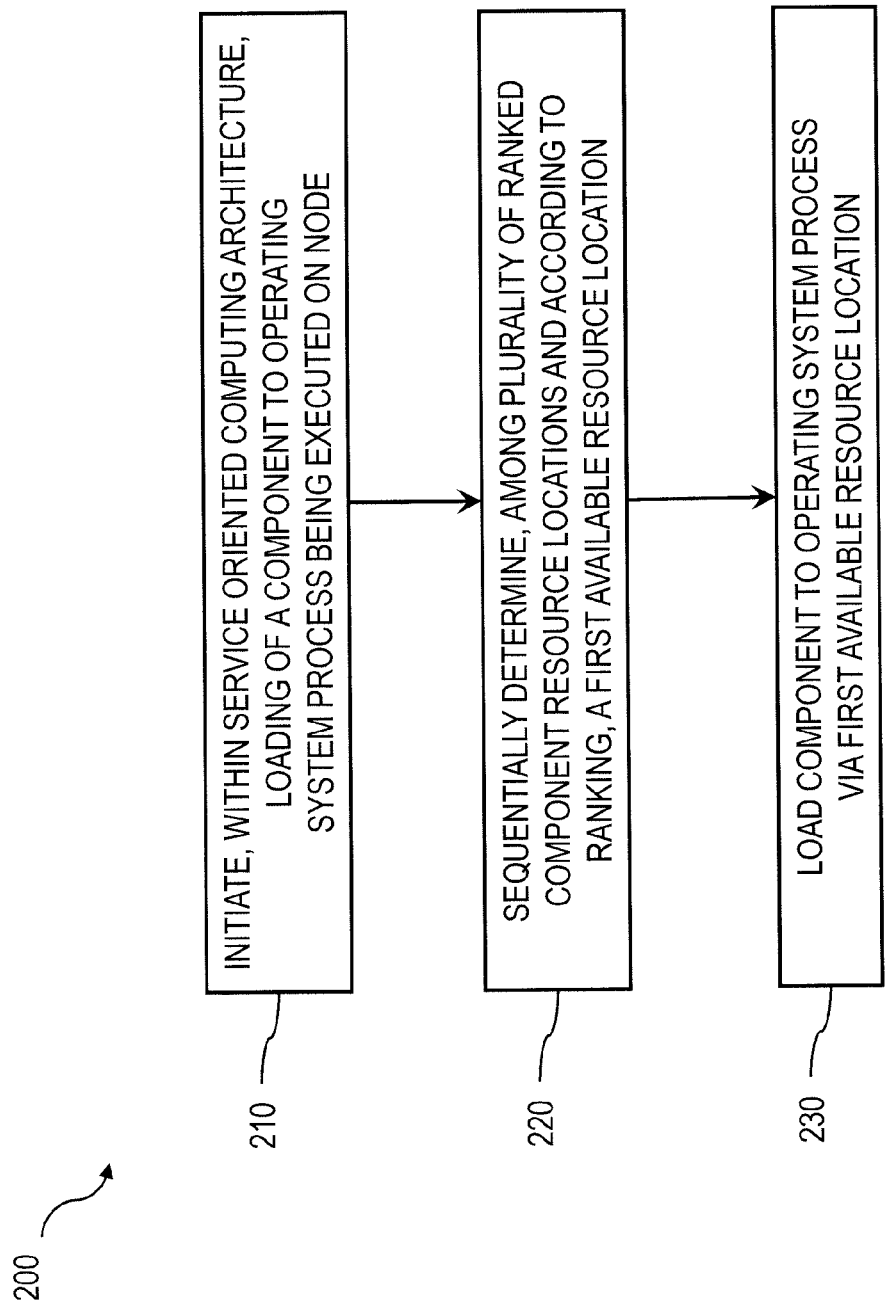
FIG. 2 is a first process flow diagram illustrating a method for accessing resources from ranked resource locations.

FIG. 2 is a process flow diagram illustrating a process for loading components into an operating system process. With reference to FIG. 2, at 210, loading of a component to an operating system process can, at 210, be initiated. Thereafter, at 220, it can be determined, among a plurality of ranked resource locations and according to the ranking, a first available resource location. The component can then, at 230, be loaded into the operation system via the first available access point.

Figure 3:
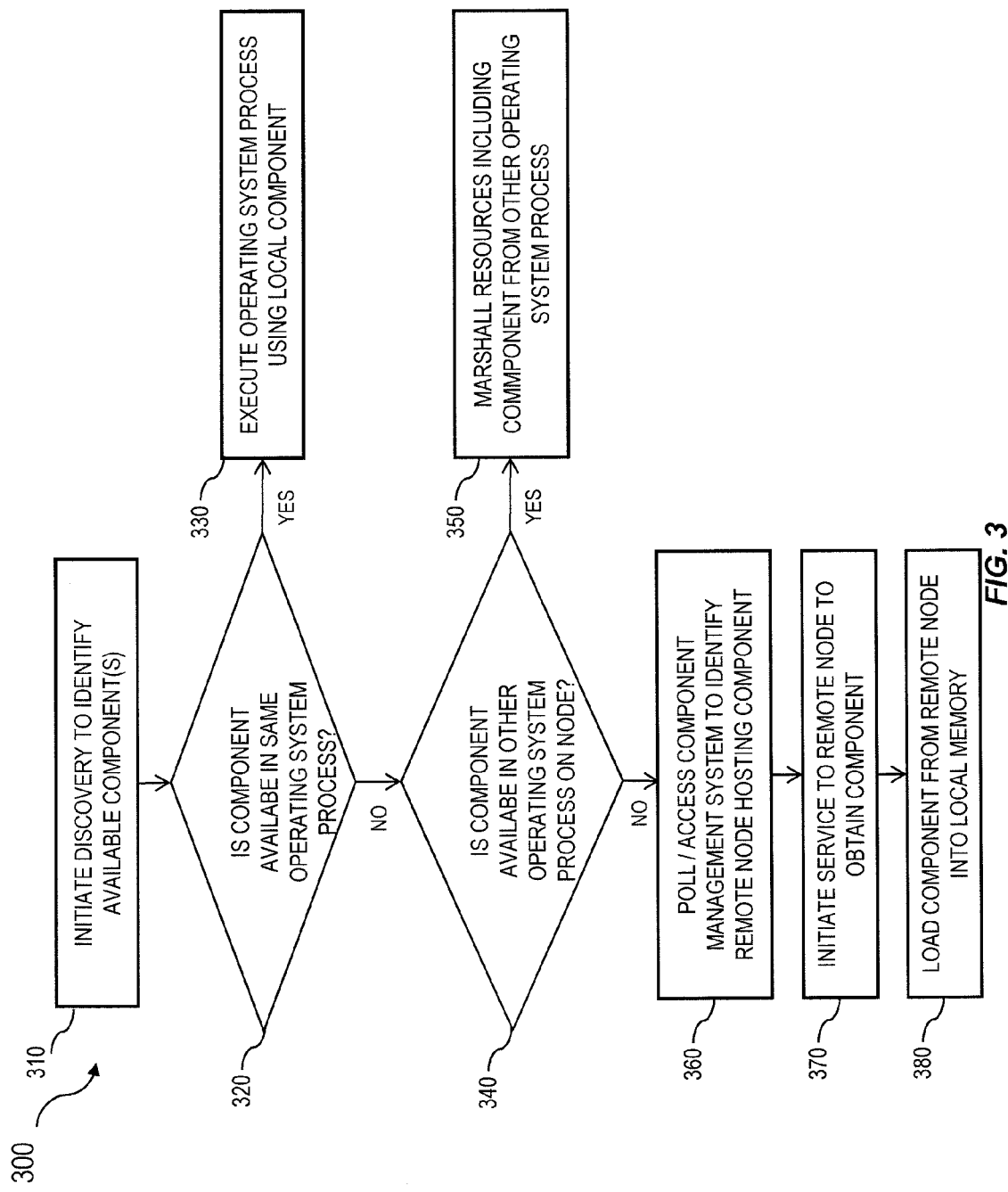
FIG. 3 is a second process flow diagram illustrating a method for accessing local resources when available, and if not available, accessing resources remotely.

FIG. 3 is a process flow diagram 300 illustrating a detailed process for identifying available components. In this example, at 310, a node that is executing a local operating system process (that in turn has access to memory local to the node such as RAM) can initiate a discovery mechanism (which can, at least partially, use the component management system) to identify available components. As will be noted below, there is a preference, from an efficiency standpoint to using locally available components.

It can be determined, at 320, whether the component is available within the same operating system process. This determination can be made, for example, by scanning one or more local dynamic-link library (DLL) files. If the component is available within the same operating system process being executed at the node, then, at 330, nothing further needs to occur. If the component is not available, then, at 340, it can be determined whether the component is available via a different operating system process being executed at the node. Such a determination can also be made by scanning one or more local DLL files.

If the component is available via a different operating system process being executed at the node then, at 350, resources can be marshaled from the different operating system process to the operating system to which the component is to be added. Various types of inter-process communication (IPC) methods can be used. For example, a pipe method can be used so that the output of the different operating system process is coupled to an input of the operating system process to which the component is to be added. The component can then be transferred via the pipe.

Subsequently, if the component is not available on the local node, the component management system can, at 360, be polled or otherwise access to identify a remote node hosting the component. Thereafter, a 370, a service can be initiated via a service call to at least one remote node hosting the component in order to obtain the component. The component can then, at 380, be loaded into the memory of the local node for use by the operating system process.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A computer-implemented method comprising:
    initiating, within a service-oriented computing architecture, loading of a component to an operating system process being executed on a node of a computing system comprising memory and at least one data processor, wherein the service-oriented computing architecture provides a set of components that can be invoked and whose interface descriptions can be published and discovered;
    sequentially determining, among a plurality of ranked component resource locations and according to the ranking, a first available resource location; and
    loading the component to the operating system process via the first available resource location;
    wherein:
        a ranking of at least one resource location is determined by scanning at least one dynamic linked library (DLL) file at the node;
        a highest ranked resource location is within the operating system process executing on the node,
        a second resource location having a ranking lower than the highest ranked resource location is within a different operating system process executing on the node, and
        the component is marshaled from the second resource location using an inter-process communication (IPC) method in which an output of the different operating system process is coupled to an input of the operating system process being executed on the node of a computing system to form a pipe through which the component is transferred.

2. A method as in claim 1, wherein a different resource location having a ranking below the highest ranked resource location is determined to be the first available resource location by scanning at least one dynamic linked library (DLL) files at the node.

3. A method as in claim 1, wherein a different resource location having a ranking below the highest ranked resource location is at a second node remote from the node.

4. A method as in claim 3 further comprising:
    polling or accessing, by the node, a component management system to identify a location of the component on the second node; and
    initiating a service to obtain the component from the second node.

5. A method as in claim 1, wherein loading the component comprises loading the component into the memory at the node.

6. A non-transitory computer program product storing instructions, which when executed by at least one data processor forming part of at least one computing system, result in operation comprising:
    initiating, within a service-oriented computing architecture, loading of a component to an operating system process being executed on a node of a computing system comprising memory and at least one data processor, wherein the service-oriented computing architecture provides a set of components that can be invoked and whose interface descriptions can be published and discovered;
    sequentially determining, among a plurality of ranked component resource locations and according to the ranking, a first available resource location, wherein a highest ranked resource location is within the operating system process executing on the node and a second resource location having a ranking lower than the highest ranked resource location is on a second node remote from the node;

polling or accessing, by the node, a component management system to identify a location of the component on the second node;

initiating a service to obtain the component from the second node; and loading the obtained component to the operating system process;

wherein a ranking of at least one resource location is determined by scanning at least one dynamic linked library (DLL) file at the node.

7. A computer program product as in claim 6, wherein a second highest ranked resource location is within a different operating system process executing on the node.

8. A computer program product as in claim 7, wherein the operations further comprise:

marshaling the component from the different operating system process executing on the node.

9. A computer program product as in claim 8, wherein the marshaling comprises an inter-process communication (IPC) method in which an output of the different operating system process is coupled to an input of the operating system process executing on the node to form a pipe through which the component is transferred.

10. A system comprising:

a plurality of nodes communicating amongst each other within a service oriented architecture, each node comprising memory and at least one data processor, wherein the service-oriented computing architecture provides a set of components that can be invoked and whose interface descriptions can be published and discovered;

wherein, upon initiation of loading of a component to an operating system process being executed on a first node, it is sequentially determined, among a plurality of ranked component resource locations and according to the ranking, a first available resource location, and wherein the component is loaded to the operating system process via the first available resource location;

wherein:

a highest ranked resource location is within the operating system process executing on the first node, a second resource location having a ranking lower than the highest ranked resource location is within a different operating system process executing on the first node, and the component is marshaled from the second resource location using an inter-process communication (IPC) method in which an output of the different operating system process is coupled to an input of the operating system process being executed on the first node to form a pipe through which the component is transferred;

a ranking of at least one resource location is determined by scanning at least one dynamic linked library (DLL) file at the node.

11. A method as in claim 1, wherein, for each node, the ranked component resource locations comprise at least one location at the node and at least one location external to the node.

12. A computer program product as in claim 6, wherein, for each node, the ranked component resource locations comprise at least one location at the node and at least one location external to the node.

13. A system as in claim 10, wherein, for each node, the ranked component resource locations comprise at least one location at the node and at least one location external to the node.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,984,532 B2 | |
| APPLICATION NO. | : 13/830306 | |
| DATED | : March 17, 2015 | |
| INVENTOR(S) | : Aron Weiler et al. | |

It is certified that error appears in the above-identified patent and that said Letters Patent is hereby corrected as shown below:

In the Specification:

In Column 3, line 43, "140'", should read --140--.

In Column 4, line 56, "Thereafter, a" should read --Thereafter, at--.

In the Claims:

In Column 6, claim 2, line 40, "files", should read --file--.

Signed and Sealed this
Fourteenth Day of July, 2015

Michelle K. Lee
*Director of the United States Patent and Trademark Office*